United States Patent [19]
McLane, Sr.

[11] Patent Number: 5,163,359
[45] Date of Patent: Nov. 17, 1992

[54] COOKING APPARATUS

[76] Inventor: Jack S. McLane, Sr., 3101 Bachman Rd., Gaston, S.C. 29053

[21] Appl. No.: 782,412

[22] Filed: Oct. 25, 1991

[51] Int. Cl.⁵ .......................................... A47J 31/00
[52] U.S. Cl. ...................................... 99/447; 99/446; 99/450; 99/482; 126/28 R; 126/41 R
[58] Field of Search ................. 99/340, 382, 446, 444, 99/450, 447; 126/25 R, 41 R

[56] References Cited

U.S. PATENT DOCUMENTS

| | | | |
|---|---|---|---|
| 1,294,159 | 11/1919 | Potts . | |
| 2,894,448 | 7/1959 | Henderson et al. | 99/340 |
| 3,322,060 | 5/1967 | Gilbert | 99/450 |
| 3,348,472 | 10/1967 | Anetsberger et al. | 99/447 |
| 3,369,481 | 2/1968 | Pappas | 99/445 |
| 3,413,912 | 12/1968 | Phelan et al. | 99/400 |
| 3,477,360 | 11/1969 | Raney | 99/339 |
| 3,683,791 | 8/1972 | Rast, Jr. | 99/340 |
| 3,792,654 | 2/1974 | Turner | 99/427 |
| 4,317,441 | 3/1982 | Berg | 126/41 R |
| 4,442,762 | 4/1984 | Beller | 99/340 |
| 4,700,618 | 10/1987 | Cox, Jr. | 99/340 |
| 4,773,319 | 9/1988 | Holland | 99/446 |
| 4,850,333 | 7/1989 | Dellrud et al. | 126/41 R |

*Primary Examiner*—Philip R. Coe
*Assistant Examiner*—Reginald L. Alexander
*Attorney, Agent, or Firm*—Michael A. Mann

[57] ABSTRACT

Cooking apparatus comprising a pair of burners offset from a grill so that grease from the cooking food drips into a sump rather than onto the burners. A series of slats above the burners direct and distribute the heated air to the grill, each slat intercepting a different portion of the heated air. A drip ledge between the burners and the grill help to channel the grease to the sump and away from the burners. The walls of the housing of the apparatus have passages for cooling by a flow of external air. A smoker intercepts some of the heated air and circulates it among wood chips, for example, and returns smoke to the housing interior.

11 Claims, 4 Drawing Sheets

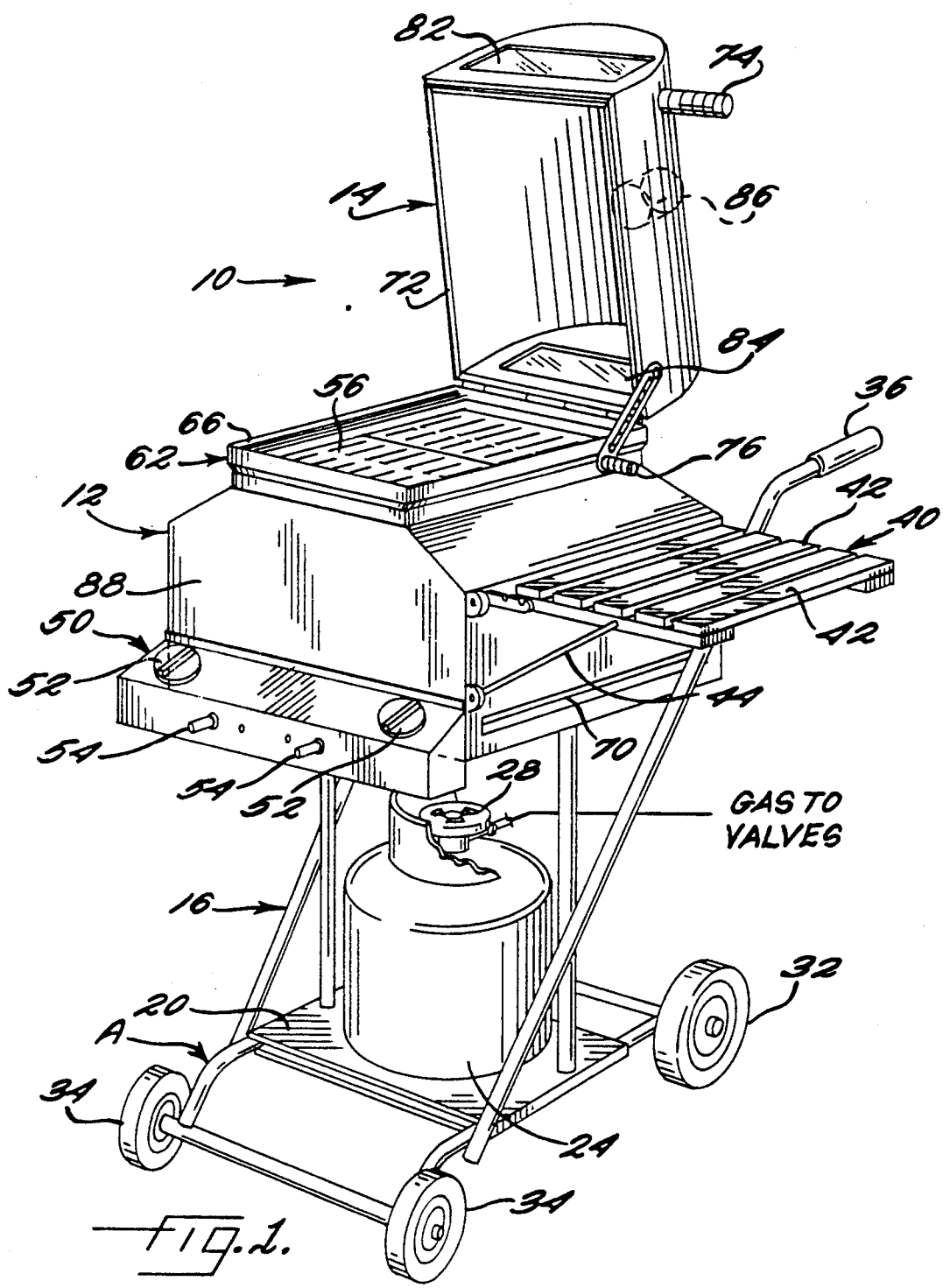

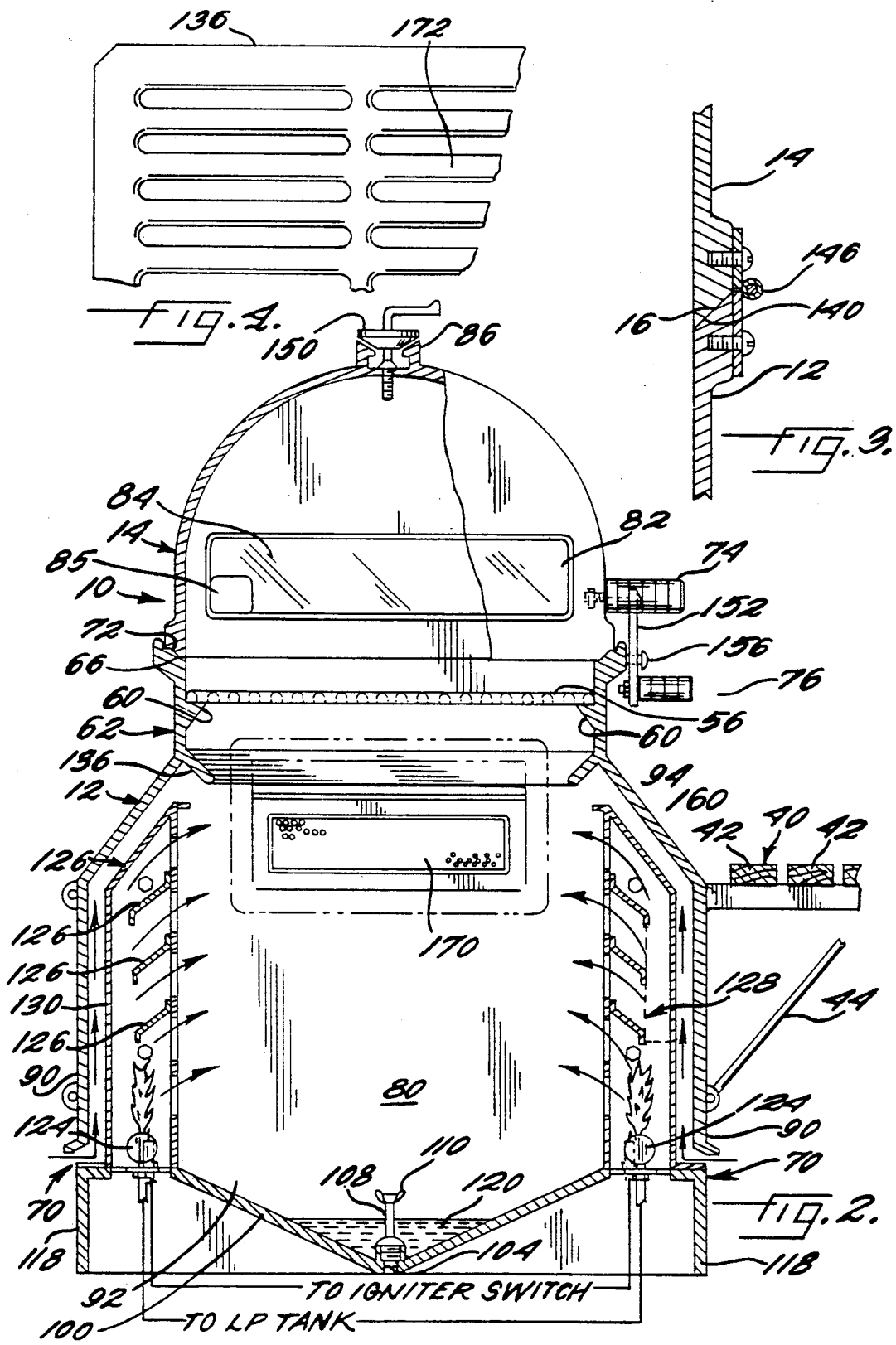

COOKING APPARATUS

BACKGROUND OF THE INVENTION

1. Field of the Invention

The present invention relates to apparatus for cooking. In particular, the present invention relates to gas grills and smokers.

2. Discussion of Background

Grilling is a popular method of preparing foods and a number of different types of cooking apparatus for grilling and improvements in these apparatus exist. Grilling is often done over burning charcoal; in other cases, grilling is done using a propane gas.

A variety of foods can be grilled, from meats and fish to vegetables. Some foods are best grilled slowly, such as chicken, while others are best grilled at high heat for brief cooking times, such as beef steak. Some foods are grilled with grease or fat added during grilling by basting; other foods contain sufficient fat that none need be added. Still other foods, for example, sausage, contain so much fat that cooking without flare up, charring and burning is difficult.

There have been attempts to improve grills by limiting the amount of flare-up, charring and burning of foods. Concern with this problem can be found in a number of US patents. See for example, my cooking apparatus described in U.S. Pat. No. 4,002,113 for effective and efficient cooking without flame or flare up. Also, Berg, in U.S. Pat. No. 4,317,441, places gas burners to the sides of vertically hung meat to prevent grease from dripping onto the burners. Phelan, et al. in U.S. Pat. No. 3,413,912, has a similar approach, using four burners to the sides of the food being grilled.

Raney (U.S. Pat. No. 3,477,360) offsets the grill from the burners but does so in order to establish a hot plate area directly over the burners.

There remains, however, a need for an efficient, effective cooking apparatus for grilling foods without flare up. Such a device should also be easily controlled and be easily cleaned and safe.

SUMMARY OF THE INVENTION

According to its major aspects and broadly stated, the present invention is an apparatus for cooking food. The apparatus comprises a housing having an interior and a wall, a lid rotatably attached to the housing and engaging the housing when in the closed position, a wheeled frame supporting the housing, a pair of burners for heating the air inside the housing, a grill supported by ledges formed in the housing wall.

The grill is above the burners but not directly over them; rather, the burners are offset from the grill so that grease from cooking food does not drip onto the burners. Moreover, a drip ledge attached to the wall of the housing helps to direct and channel grease to a sump at the bottom of the housing. To assure uniformly distributed heat to the grill, a series of slats is mounted above the burners, each slat intercepting a different portion of the heated air and directing and distributing it to the grill so that the grill is heated uniformly.

The walls of the apparatus are cooled by the flow of external air through passages between the walls and adjacent to the burners. A smoker is attached to the back of the apparatus for providing smoke flavor to the cooking food. The smoker extracts air heated by said burners from the interior of the housing, circulates it through wood chips for example and returns smoke to the housing.

The lid and housing engage when the lid is closed in such a way that any grease on the edges of the lid or housing is channeled back into the housing interior. The lid has a bracket for holding the lid securely in the open position.

The relative positions of the burners and the grill in combination with the series of slats is an important feature of the present invention. By offsetting the lid and housing from each other, the grease dripping from the grill will not fall on the burners and flare up. Thus, the present apparatus is safer than other cooking apparatus and more controllable because the burners can be turned higher for faster cooking of such items as beef steaks without concern for the burning or charring due to flare up. The series of slats assures that cooking of food on the grill, however, remains uniform because the slats distribute the heated air substantially uniformly.

The combination of the sump and drip ledge are another important feature of the present invention. Both act together to channel and collect grease so that it does not drip on the burners but accumulates at the bottom of the housing below the burners where it can be easily removed. The sump is preferably filled with water prior to cooking so that the hot grease, falling from the grill and drip ledge, is quickly cooled and floats on the surface of the water. The cooled grease is below the burners and is cooled quickly and sufficiently so that it will not burn. The reservoir of water simplifies cleanup because the accumulated grease is not allowed to cool against the metal surface. Thus, to a significant extent, the apparatus is self-cleaning and may only need an occasional wipe down with a towel.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a cooking apparatus according to a preferred embodiment of the present invention;

FIG. 2 is a cross sectional view of the apparatus shown in FIG. 1;

FIG. 3 is a detailed cross sectional view of the lid/housing closure along the back of the apparatus shown in FIG. 1;

FIG. 4 is a partial top plan view of the grill of the apparatus shown in FIG. 1;

DETAILED DESCRIPTION OF A PREFERRED EMBODIMENT

Figure 5:
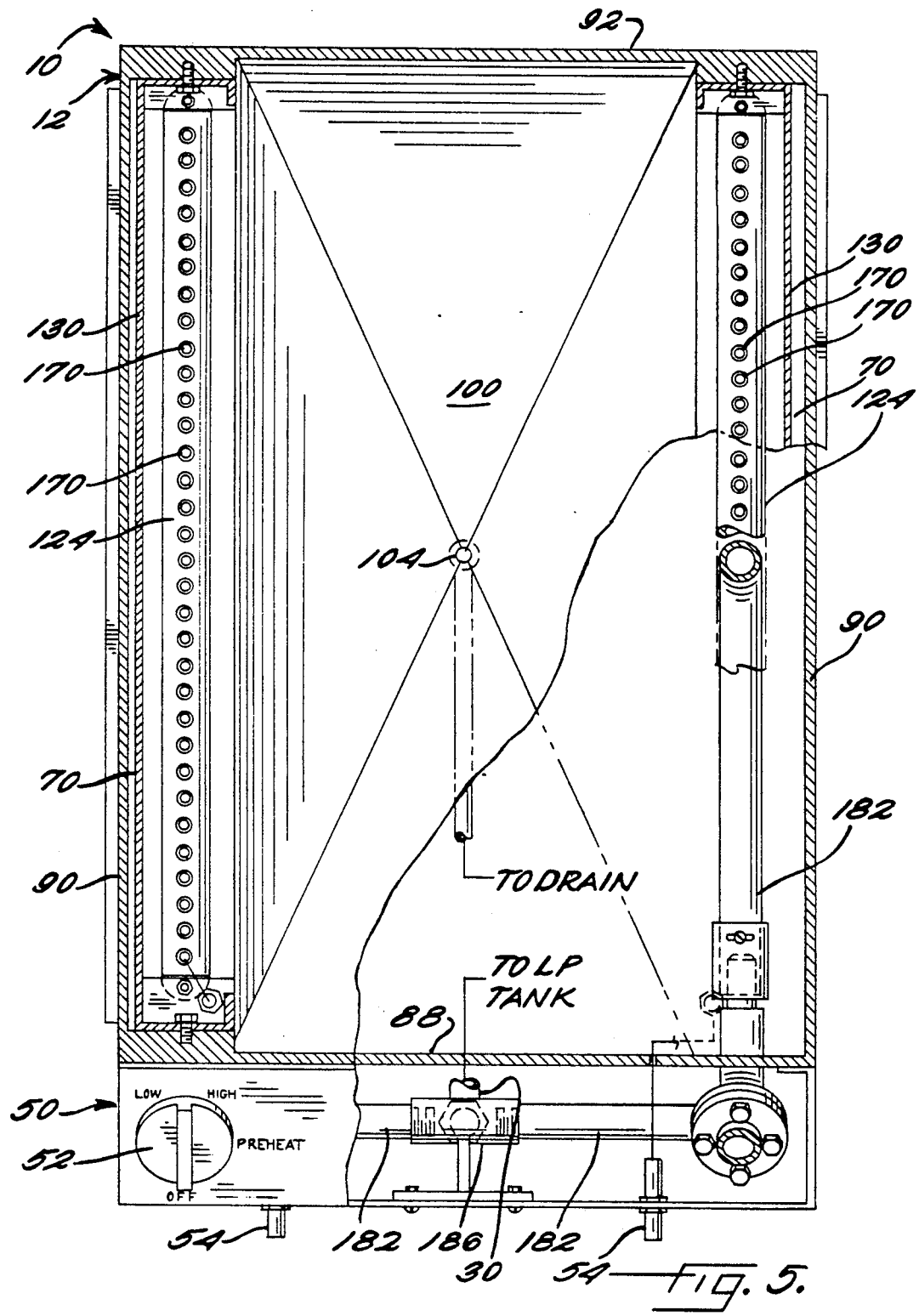
FIG. 5 is a top plan view of the sump of the apparatus, with a portion cut away to show one of the burners according to a preferred embodiment of the present invention.

Referring now to FIG. 1, there is illustrated in perspective a cooking apparatus 10 according to a preferred embodiment of the present invention. Cooking apparatus 10 comprises a housing 12 with a hinged, pivotable lid 14, both of which are preferably mounted to a frame 16, and most preferably a wheeled frame to permit movement of the cooking apparatus.

Frame 16 has a shelf 20 to hold a tank 24 carrying liquid propane for use as a fuel. Tank 24 has a valve 28 and a hose 30 that connects to apparatus 10 as will be described more fully below. Frame 16 also has four wheels 32, preferably two larger wheels in the rear and two smaller wheels 34 in the front. A pair of handles 36 are mounted onto frame 16 rearwardly and, together with larger rear wheels 32, and a downward bend in frame 16 at A facilitate movement of apparatus 10 in "wheel barrow" style.

Housing 12 has a utility shelf 40, preferably made of wood slats 42 and supported by a bracket 44. A control panel 50 is attached to the front of housing 12 with control knobs 52 for each burner and separate igniters knobs 54 for each burner. Housing 12 narrows toward the top where a grill 56 rests on ledges 60 formed in a collar 62 about the top of housing near its uppermost edge 66. Also, along the sides of housing 12 are two narrow passages 70 that lead to the interior of housing 12 for purposes of cooling as will be described below.

Lid 14 also has an edge 72 that engages edge 66 of housing 12 when in a closed position. Lid 14 is shown in FIG. 1 in the open position. Opening and closing lid is done using a handle 74. The interior 80 of apparatus 10 may be observed when lid 14 is in the closed position through windows 82, 84. Window 82 may include a temperature gauge 85. A chimney 86 is provided to relieve pressure, as will be described more fully below.

FIG. 2 shows a cross sectional view of a preferred embodiment of housing 12 and lid 14 of apparatus 10. Housing 12 has front wall 88 (FIG. 1), side walls 90, a rear wall 92 with a smoker 94, utility shelf 40 and collar 62 with ledges 60, for grill 56 and edge 66. Lid 14 has handle 74, chimney 86 and windows 82, 84. The bottom of housing 12 is in the shape of an inverted pyramid to form a sump 100 with a drain 104 and valve 108 that is openable and closable using a simple wing nut 110, for example. Sump 100 is preferably filled with water 120 prior to beginning cooking. Sump drain valve stem 112 has a marking to assist the user in determining the depth of water (or other nonflammable coolant). Sump 100 is directly below grill 56. Below but offset from grill 56 are, preferably, two burners 124 in operational connection with tank 24 and control knobs 52. Burners 124 heat the air directly above them which is directed by a series of slats 126 to interior 80 below grill 56. Slats 126 are held in spaced-apart position at an angle 128 with respect to the horizontal by a bracket 130 with openings 132 therebetween for the heated air to flow as indicated by the arrows. Bracket 130 and walls 90 and 92 extend downwardly to form a skirt 118. Passages 70 defined by brackets 130 and side walls 90 of housing 12 admit air from the exterior of apparatus 10 to interior 80 to keep side walls 90 cool and provide additional oxygen for combustion (the primary source of oxygen is air from the spaces adjacent to burners 124). Each slat 126 is a different length, with slats 126 being shorter toward burners 124 and longer away from burners 124 so that a different portion of the air above the burners is intercepted by each slat. The various portions of air are directed into interior 80 for better distribution so that grill 56 is heated substantially uniformly for more even cooking.

Between burners 124 and grill 56 is a drip ledge 136 which extends around collar 62 just below grill 56. When foods are being cooked, grease will drip from the foods to sump 100 and follow grill 56 to a sump 100 or drip ledge 136 and then sump 100. An important feature of apparatus 10 is the control of this grease to prevent it from falling onto burners 124 where it can catch fire and flare up.

Grease will also spatter upwardly and to the sides and may collect near the edges 66, 72 of housing 12 and lid 14. Therefore, edges 66, 72 are formed to not only align lid 14 and housing 12 when lid 14 is in the closed position but also direct grease back into housing 12. As can be seen from FIG. 2 in the case of the sides of apparatus 10 and from FIG. 3 in the case of rear edges 140, 142 of housing 12 and lid 14 (front edges, not shown, are the same as side edges), the outermost part of housing edges 66, 140 are higher than the innermost and generally slope upwardly from inside to out. The rearward edges are connected preferably with a "piano-type" hinge 146 for best allignment and strength. The side and front edges of housing 12 are preferably thicker to better bear the weight of lid 14.

Lid 14 has a chimney 86 that serves to control combustion by helping to create a draft and to facilitate smoking by holding smoke in interior 80 longer or less long, as desired, by the amount a valve 150 that changes the size of the opening of chimney 86 is opened. For faster cooking, control knobs 52 are turned on high so that burners 124 heat more air. Valve 150 can then be opened fully for creating a stronger, upward draft. For slower cooking, valve 150 is kept relatively closed, but is designed so that it does not close all the way, and burners 124 turned down accordingly.

Figure 6:
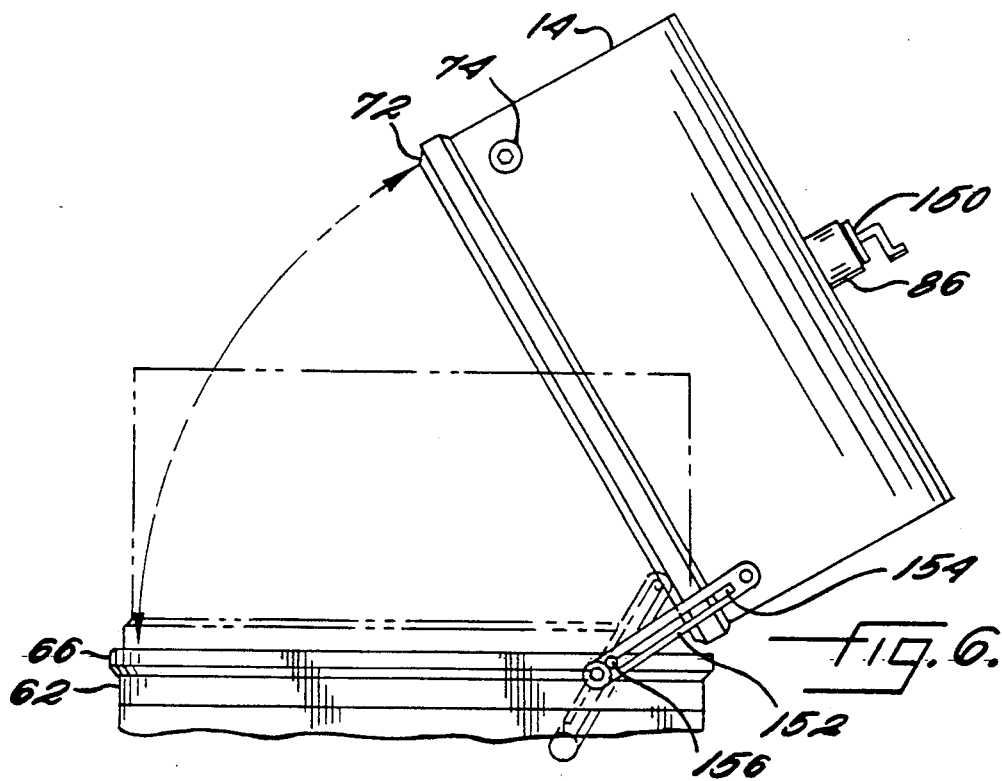
FIG. 6 is a side view of the lid and lid support bracket of an apparatus according to a preferred embodiment of the present invention.

A handle 74 is attached to lid 14. To one side of lid 14 is a second handle 76 which is attached to a bracket 152 connecting lid 14 to housing 12, as best seen in FIG. 6. Bracket 152 has an "L" shaped slot 154, through which a bolt 156 is passed and secured with a nut, to permit control when lid 14 is moved from the closed position to the opened position, the bolt 156 seating in the base of the "L" when lid 14 has reached to extreme open position to hold lid 14 open in a "hands free" condition.

Figures 7, 8:
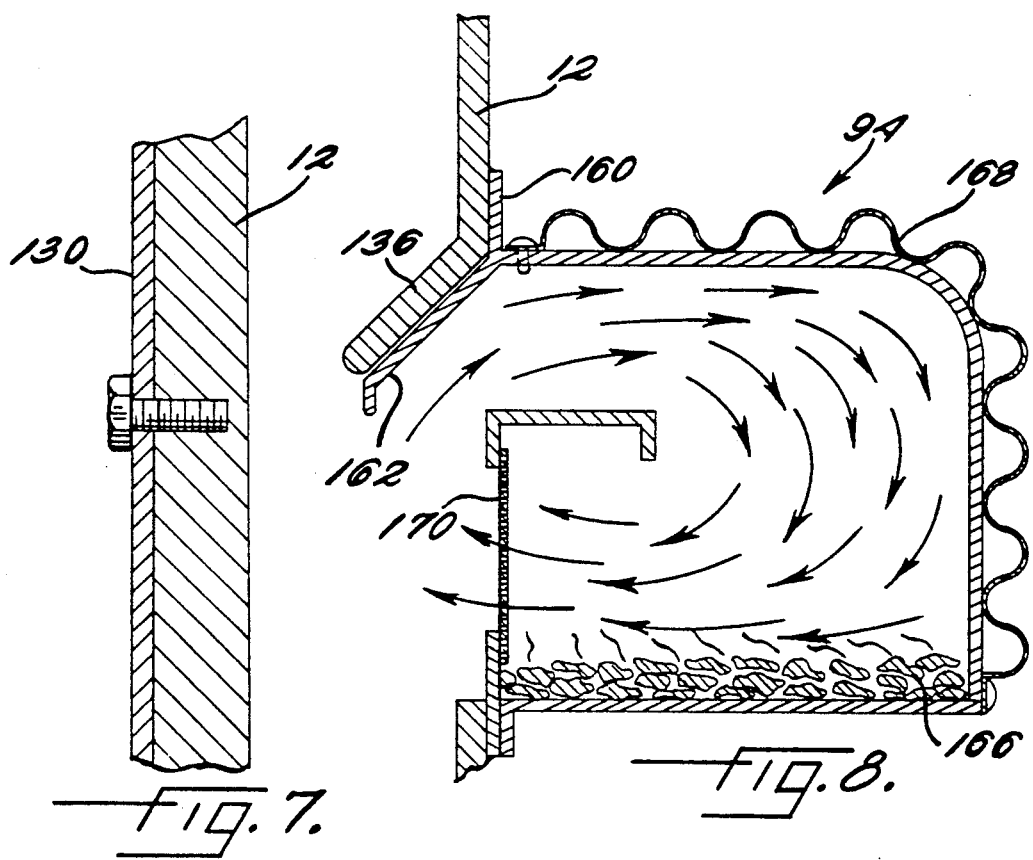
FIG. 7 is a cross sectional view of the wall of the housing, according to a preferred embodiment of the present invention.
FIG. 8 is a cross sectional view of the smoker attachment according to a preferred embodiment of the present invention.

Smoker 94 is shown in side cross section in FIG. 8. It is in the form of a small chamber fitted to rear wall 92 of housing 12 with a flange 160 and positioned just below drip ledge 136. An extension 162 of smoker penetrates into space just below and parallel to drip ledge 136 to intercept a portion of the heated air and cause it to circulate by convection to the interior of smoker 94 over wood chips 166 or hardwood pulp, liquid or other aromatic, smoking medium, and out into interior 80 again through an array 170 of holes. When fluids are used with the smoking medium, smoker 94 has a humidfying effect which will enhance the taste of the grilled food. Preferably a corrugated surface 168 is attached to the exterior of smoker 94 to help dissipate heat. Alternatively, smoker 94 can be made so that heat and air circulation is achieved through standard electrical means.

FIG. 4 shows a top plan view of grill 56 which is preferably formed as an array 172 of rounded or curved tubes by stamping or molding sheet metal stock. Also, grill 56 is preferably made in two pieces for ease in fitting into a dishwasher for cleaning.

FIG. 5 is a top plan view of the bottom of apparatus 10. The bottom is made with a low-lying area in the center to form sump 100, which has drain 104 to remove accumulated grease and water. To the sides are burners 124 which are preferably in the form of closed tubes 176 having a series of round holes 178 along the topmost portion for gas to be vented. Gas is ignited by igniter knobs 34, one for each burner 124. Each burner 124 then produces heat for heating the air above which travels upwardly through brackets 130 which are attached to housing 12 as shown in the detail of FIG. 7 and is then directed and distributed to interior 80 above sump 100 and directly under grill 56.

Control panel 50, preferably angled for easier viewing and use, enables control of the flow of gas from tank 24 through gas lines 182 to burners 124. Gas lines 182 are preferably carried external to housing 12 and within the area defined by skirt 118 but supported by brackets (not shown) attached to housing 12. Flexible gas hose 30 leading to tank 24 is angled downwardly from its attachment to a hose connector 186 at approximately a 45° angle.

In use, valve 108 at the bottom of sump 100 is closed and water is poured into the sump to a height just below burners 124, as indicated by the marking on sump valve stem 112 and grill 56 is then set into place on ledges 60. Valve 150 of chimney 86 is adjusted to the desired setting. Control knobs 52 are turned to a preheat position and, after a brief pause to allow the gas to flow to burners 124, igniter knobs 34 are pressed to ignite the gas. Brackets 152 is lifted free by raising handle 74 slightly and then lid 14 can be lowered to close apparatus 10 and prevent heat from escaping too readily. After a few minutes, grill 56 is normally sufficiently hot to allow cooking.

Apparatus 10 is preferably made of cast aluminum or iron but may be made of any suitable metal capable of withstanding cooking temperatures for extended periods of time, easily worked and easily cleaned. Furthermore, additional features such as rotisseries can be easily added.

It will be apparent to those skilled in the art that many changes and substitutions can be made to the preferred embodiment herein described without departing from the spirit and scope of the present invention as defined by the appended claims.

What is claimed is:

1. An apparatus for cooking food, comprising:
   a housing having an interior and a wall;
   a lid rotatably attached to said housing;
   a frame supporting said housing and said lid;
   burner means for heating air interior to said housing;
   a grill supported by said housing wall, said grill positioned above said burner means but not directly over said burner means; and
   a series of slats supported by said housing wall and positioned directly over said burners and in spaced relation to said grill, each of said slats formed to intercept a portion of the air heated by said burner and to direct said portion of heated air directly under said grill so that said portion of air can heat said grill.

2. The apparatus as recited in claim 1, further comprising means for collecting any grease dripping from food cooking on said grill.

3. The apparatus as recited in claim 1, further comprising:
   a sump at the bottom of said housing; and
   means attached to the inside wall of said housing between said grill and said burner means for channeling grease from cooking food toward said pump and away from said burner means.

4. The apparatus as recited in claim 1, further comprising means formed in said housing for cooling said housing wall.

5. The apparatus as recited in claim 1, further comprising smoker means for producing smoke, said smoker means extracting air heated by said burner means from said housing and returning smoke to said housing.

6. The apparatus as recited in claim 1, wherein said lid has a closed position and an open position, and said apparatus further comprises means for holding said lid in said open position.

7. An apparatus for cooking food, comprising:
   a housing having an interior and a wall;
   a sump at the bottom of said housing;
   a lid rotatably attached to said housing and having an open position and a closed position;
   a frame supporting said housing and said lid;
   burner means for heating air interior to said housing;
   a grill supported by said housing wall, said grill positioned above said burner means but not directly over said burner means; and
   a series of slats supported by said wall of said housing over said burner means, each of said slats formed to intercept a portion of the air heated by said burner means and to direct said portion of heated air directly under said grill so that said portion of air can heat said grill.

8. The apparatus as recited in claim 7, further comprising means attached to said housing between said grill and said burner means for channeling grease from cooking food toward said sump and away from said burner means.

9. The apparatus as recited in claim 7, wherein said lid has an edge and said housing has an edge, said edge of said lid engaging said edge of said housing when said lid is in said closed position, and said channeling means further comprises:
   a drip ledge positioned between said grill and said burner means for channeling grease from cooking food toward said sump and away from said burner means and attached to said housing between said grill and said burner means; and
   means formed in said edges of said lid and said housing for preventing grease from leaving the interior of said housing when said lid is in said closed position and for aligning said edge of said lid and said edge of said housing when said lid is in said closed position.

10. The apparatus as recited in claim 7, further comprising passages formed in said housing and adjacent said burner means for cooling said housing wall.

11. The apparatus as recited in claim 7, further comprising a smoker, said smoker attached to said wall of said housing and extracting air heated by said burner means from said housing and returning smoke to said housing below said grill.

* * * * *